Jan. 2, 1923.
R. P. DAIGLE.
VEHICLE BRAKE APPARATUS.
FILED NOV. 19, 1921.
1,441,145.
2 SHEETS—SHEET 2.
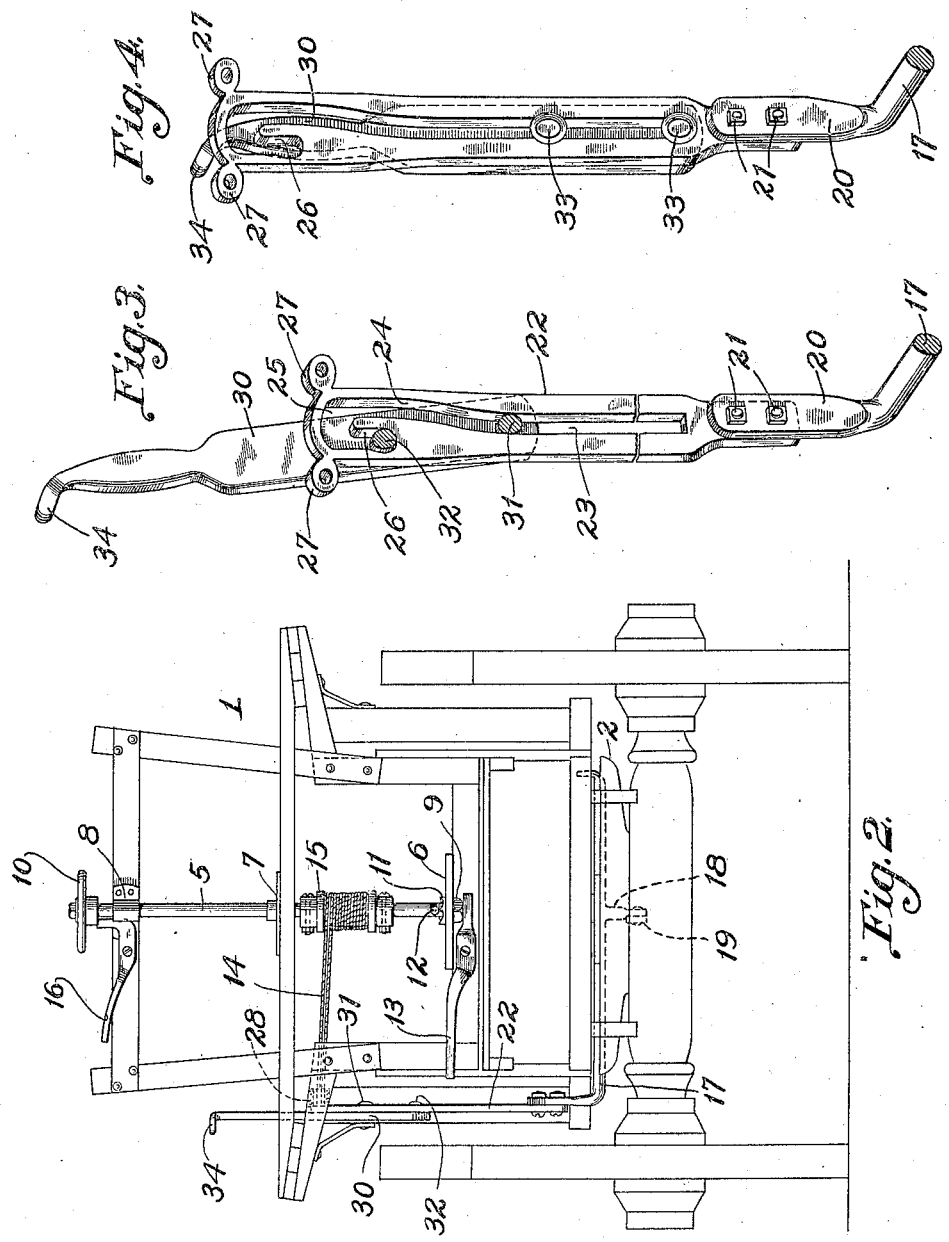
Inventor
Renie P. Daigle.
his Attorneys.

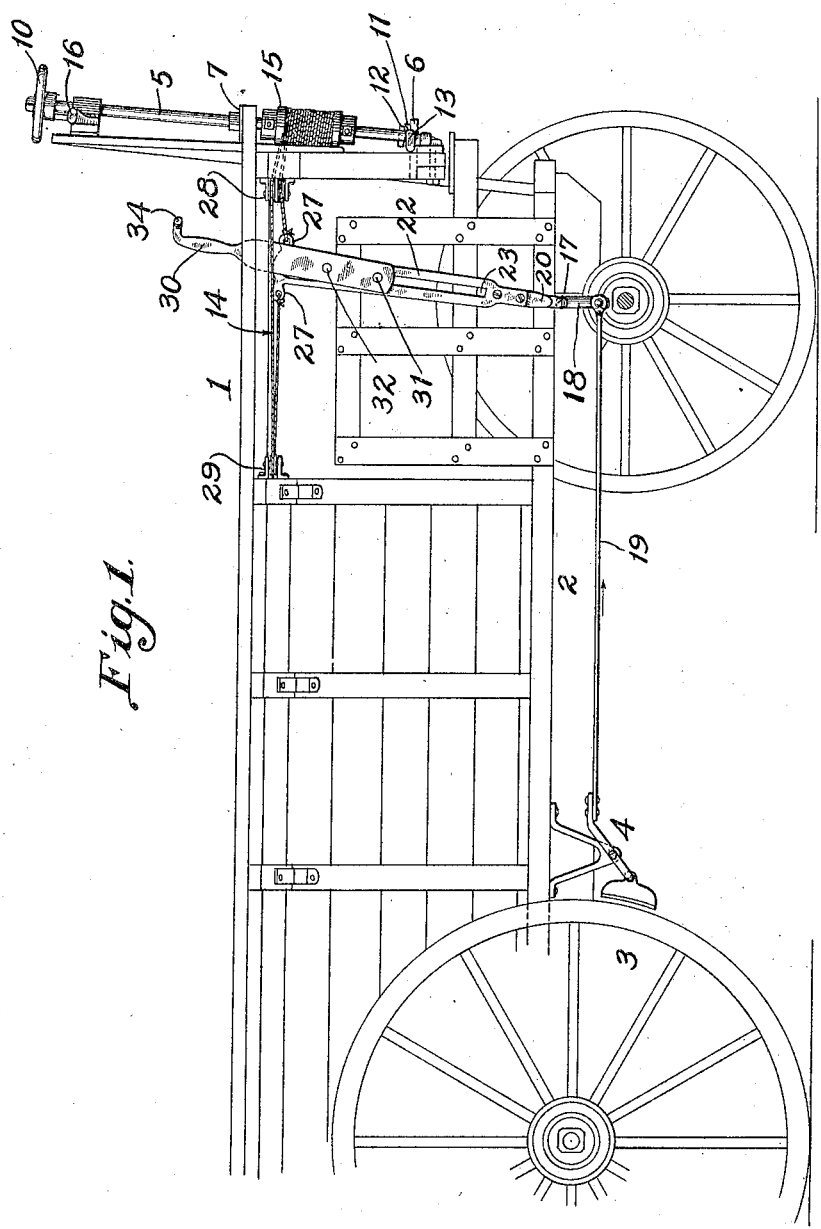

Patented Jan. 2, 1923.

1,441,145

UNITED STATES PATENT OFFICE.

REMIE P. DAIGLE, OF VAN BUREN, MAINE.

VEHICLE BRAKE APPARATUS.

Application filed November 19, 1921. Serial No. 516,390.

*To all whom it may concern:*

Be it known that I, REMIE P. DAIGLE, a citizen of the United States, residing at Van Buren, in the county of Aroostook and State of Maine, have invented certain new and useful Improvements in Vehicle Brake Apparatus, of which the following is a specification, reference being had therein to the accompanying drawings.

This invention relates to a vehicle brake apparatus, and the object of the invention is the construction of a simple and efficient mechanism for operating the vehicle brake, the mechanism being especially adapted to a rack-body for a vehicle.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a view in side elevation of a mechanism constructed in accordance with the present invention, while Figure 2 is a front view of the same.

Figure 3 is a fragmentary, perspective view of the mechanism, showing particularly the frame and sliding handle thereof, while Figure 4 is a similar view, showing the handle in a closed position upon the frame.

Referring to the drawings by numerals, 1 designates the body or vehicle-rack that is supported upon the running gear 2, and attached to the running gear, for braking the rear wheels 3, is a suitable brake means 4 (Fig. 1.)

My brake-means operating mechanism comprises a vertical shaft 5 journalled in a lower plate 6, central plate 7 and bracket 8; these plates 6 and 7 and bracket 8 are supported upon portions of the body or vehicle-rack 1. A suitable head, constituted by nut 9, is formed on the lower end of the shaft 5, and attached to the upper end of the shaft is a hand-wheel 10. Formed upon the lower plate 6 is a ratchet 11, and a transverse pin 12, fastened to shaft 5 (Fig. 2), is adapted to engage the teeth of ratchet 11 for normally preventing movement of the shaft in one direction. A lower lever 13 is pivotally mounted on the rack 1, below the plate 6, and the inner end of the lever engages the head 9, whereby the operator, by pressing down upon the outer end of the lever 13, can raise the shaft 5 for disengaging the pin 12 from the teeth of the ratchet 11, thereby permitting the unwinding of cable 14 off the drum 15, which drum is fastened to the shaft 5, preferably between plates 6 and 7. The same function of releasing pin 12 from the teeth of ratchet 11 can be accomplished by operating the upper lever 16; the lever 16 engages at its inner end the hand-wheel 10, and by the operator pressing down on the outer end of the lever, the shaft 5 can be bodily lifted in a vertical plane for permitting cable 14 to unwind off the drum 15; as long as the operator is pressing down upon the outer end of lever 16, the unwinding of the drum may take place, but upon the operator releasing the lever, the weight of the shaft will cause pin 12 to seat in the ratchet 11, thereby preventing any further unwinding of the cable 14 off drum 15.

A transverse shaft 17 is provided with a depending lug 18, which lug is connected to operating rod 19, the rod 19 being connected at one end to the brake means 4. Shaft 17 is provided at one end with an upstanding arm 20 and fastened to arm 20, by bolts 21, is vertical frame 22. Frame 22 is provided with an angular slot 23, which slot 23 has its lower portion formed in the central part of frame 22, whereas the upper portion of the slot is formed on a curve, at 24, and terminates at its upper end in an enlarged portion 25; the enlarged portion 25 of the slot 23 communicates with the side notch 26, and on the extreme upper end of the frame 22 are integral, apertured ears 27; these ears are formed upon opposite sides of the upper end, and threaded through said ears are the ends of the cable 14. The cable 14 is wound around the drum 15, and then passes over the double pulley device 28 and around a single pulley device 29, with its ends attached to the ears 27.

A sliding handle 30 engages frame 22 and extending from the inner face of the handle 30 is a lower lug 31 and an upper lug 32; these lugs are provided with heads 33, Fig. 4. The lugs (which may be in the form of rivets) are adapted to slide longitudinally of slot 23, and the upper lug 32 may easily be placed in the side notch 26 when it is desired to hold the handle 30 in its upper, extending position. But when the handle is not in use, it may be quickly slid to its lowest or unset position, shown in Fig. 4. By the operator grasping the grip 34 of handle 30, the same can be quickly moved to its operable position, Fig. 3, for operating the brake means 4 when the rack 1 is loaded, or unloaded, as the case may be; however, if the rack is greatly loaded, such as when filled with straw or hay, the operator can easily operate the brake means 4, through the medium of hand-wheel 10 and upper lever 16; by turning the hand-wheel in one direction, the cable will be actuated, through the medium of drum 15, to move the frame 22 for operating the brake means 4 for applying or not applying the brake means to the rear wheels, and by reversing the movement of hand-wheel 10, opposite movement of the mechanism will be caused for reversing the movement of the brake means 4, as the case may be. My brake-operating mechanism is very simple in structure and simple to operate.

In the following claims, I use the term "vehicle-rack" in a broad sense, as it will be understood that the "rack" may be in the nature of any kind of a body, such as a closed wagon-body, or the like.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a mechanism of the class described, the combination with brake means, of a transverse shaft provided with a depending lug and an upstanding arm, means connecting said depending lug to the brake means, a slotted frame fastened at its lower end to said arm, said frame and slot provided with a notch, and a sliding handle engaging said frame and provided with means extending into the slot and the notch, whereby the handle may be placed in an unset position with respect to the frame or be placed in a set position for operating the brake means.

2. In a mechanism of the class described, the combination with brake means, of a frame provided with a longitudinally-extending slot formed at an angle near one end and terminating in a side notch, means connecting said frame to said brake means, a sliding handle provided with a pair of lugs positioned in said slot, heads on said lugs, one of said lugs adapted to be positioned in said side notch for holding the handle in an extended position, and both of the lugs adapted to be positioned in the lower part of the slot when the handle is unset or in a lowered position.

3. In a mechanism of the class described, the combination with brake means, of a frame provided with a longitudinally-extending slot having an upper angular portion terminating in an enlarged portion at the upper end of the frame, said enlarged portion of the slot terminating in a side notch, a sliding handle provided at its upper end with a grip engaging one side of the frame, headed lugs slidably mounted in said slot and in said side notch, whereby when one lug is in said notch the handle will be retained in an operative position, and when the lugs are in the lower portion of the slot the handle will be in an unset position for not operating the brake means, and means connecting the lower end of the frame to said brake means.

4. In a mechanism of the class described, the combination with a body or a rack and brake means, of a vertically-movable, rotatable shaft mounted upon said rack, a plate with a ratchet, said shaft extending through said ratchet and plate, a pin on said shaft contiguous to said ratchet, a head formed upon the lower end of said shaft, a hand-wheel attached to the upper end of said shaft, a lower pivotally mounted lever on the rack and engaging at its inner end said head, an upper pivotal lever engaging at its inner end said hand-wheel, the operation of either of said levers releasing said pin from said ratchet, and means connecting said shaft between the levers with the brake means, whereby rotation of the shaft will operate said brake means.

5. In a mechanism of the class described, the combination with brake means and a rack, of a slotted frame contiguous to said rack, a sliding handle mounted in said slotted frame, said frame provided at its upper end with oppositely-extending apertured ears, means connecting said frame and the brake means, a vertically-movable, rotatable shaft on said rack, means for locking said shaft against rotary movement in one direction, lever means for moving said shaft and releasing the same from said locking means, a drum fastened to said shaft, a double pulley device and a single pulley device on said rack, a cable wound around said drum and passing through said double and single pulley devices, and the ends of said cable fastened in the apertured ears of the frame, substantially as shown and described.

In testimony whereof I hereunto affix my signature.

REMIE P. DAIGLE.